United States Patent
Zansky et al.

(10) Patent No.: US 7,209,357 B2
(45) Date of Patent: Apr. 24, 2007

(54) UNIVERSAL MODULAR POWER SUPPLY CARRIER

(75) Inventors: Zoltan Zansky, San Carlos, CA (US); James Robert Davis, Los Gatos, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

(21) Appl. No.: 11/199,019

(22) Filed: Aug. 8, 2005

(65) Prior Publication Data

US 2005/0276023 A1    Dec. 15, 2005

Related U.S. Application Data

(62) Division of application No. 10/320,597, filed on Dec. 16, 2002, now Pat. No. 6,947,287.

(51) Int. Cl.
*H05K 5/02*      (2006.01)
*H05K 7/20*      (2006.01)

(52) U.S. Cl. ............................ 361/731; 361/728

(58) Field of Classification Search ......... 361/676, 361/677, 678, 688–690, 724, 728–731
See application file for complete search history.

(56) References Cited

U.S. PATENT DOCUMENTS

| | | | |
|---|---|---|---|
| 3,586,915 A | 6/1971 | Urquhart | 317/100 |
| 3,749,981 A | 7/1973 | Koltuniak et al. | 317/100 |
| 3,829,740 A | 8/1974 | Beasley | 317/100 |
| 4,539,487 A * | 9/1985 | Ishii | 307/44 |
| 4,652,769 A | 3/1987 | Smith et al. | 307/31 |
| 5,140,501 A | 8/1992 | Takahashi et al. | 361/415 |
| 5,289,363 A | 2/1994 | Ferchau et al. | 363/141 |
| 5,471,099 A | 11/1995 | Larabell et al. | 307/53 |
| 5,616,968 A * | 4/1997 | Fujii et al. | 307/66 |
| 5,640,061 A | 6/1997 | Bornhorst et al. | 307/150 |
| 5,708,563 A * | 1/1998 | Cranston et al. | 361/683 |
| 5,837,968 A | 11/1998 | Rohrberg et al. | 219/130.1 |
| 5,870,284 A | 2/1999 | Stewart et al. | 361/699 |
| 6,046,921 A | 4/2000 | Tracewell et al. | 363/141 |
| 6,119,768 A | 9/2000 | Dreier et al. | 165/104.33 |
| 6,121,695 A | 9/2000 | Loh | 307/64 |
| 6,205,029 B1 | 3/2001 | Byrne et al. | 361/724 |
| 6,394,175 B1 | 5/2002 | Chen et al. | 165/80.3 |
| 6,466,433 B1 | 10/2002 | Diaz et al. | 361/683 |
| 6,972,688 B2 * | 12/2005 | Rapaich | 340/693.1 |
| 2002/0193015 A1 | 12/2002 | Milan | 439/752.5 |
| 2003/0085624 A1* | 5/2003 | Kadoi et al. | 307/64 |

FOREIGN PATENT DOCUMENTS

JP       02206922      8/1990

* cited by examiner

*Primary Examiner*—Anatoly Vortman
(74) *Attorney, Agent, or Firm*—Suiter Swantz pc llo

(57) ABSTRACT

A universal modular power supply carrier mounts different sized power supplies within a substantially rectangular body designed for thermal and electromagnetic emissions control. The power supplies are preferably secured within the carrier body. Input connectors may be alternating current or direct current. The output connector may be pin, or blade, and socket with blind mating capability. One or more direct current voltages may be output by the carrier to a motherboard or other electronic circuitry. The universal modular power supply carrier may be contained in a one-size universal electronic equipment cabinet.

15 Claims, 7 Drawing Sheets

UNIVERSAL MODULAR POWER SUPPLY CARRIER

CROSS-REFERENCE TO RELATED DOCUMENTS

The present application is a divisional of U.S. patent application Ser. No. 10/320,597, filed Dec. 16, 2002 now U.S. Pat. No. 6,947,287, which is herein incorporated by reference in its entirety.

FIELD OF THE INVENTION

The present invention generally relates to the field of portable power supplies, and particularly to a power supply enclosure that can accommodate differently sized power supplies and, optionally, provide intelligent monitoring and control of power supplied to electronic equipment.

BACKGROUND OF THE INVENTION

When a data storage system, such as a file server, computer server, or other high availability scalable electronic system, is developed, either a customized power supply must be developed or several differently sized power supplies must be accommodated. Both approaches have disadvantages. Customized power supplies cost $30–50 K and take about six months to develop. Standard supplies tend to not meet the combined size and electrical requirements.

Therefore, it would be desirable to provide uniformly sized carrier modules for housing off-the-shelf or commercially available power supplies.

SUMMARY OF THE INVENTION

Accordingly, the present invention is directed to a predefined power supply enclosure that can accommodate different off-the-shelf power supply assemblies. Depending upon the different power requirements, selected off-the-shelf power supply assemblies can be mounted on the enclosure.

In a first aspect of the present invention, a universal modular power supply carrier includes a substantially rectangular body formed of a rigid material having good thermal conductivity. The interior of the body is substantially hollow. Mounting attachments connected to the substantially rectangular body secure one or more power supplies of various sizes. The carrier has an alternating current connector or a direct current connector to receive an input voltage. The carrier has an output connector to supply one or more direct current voltages to a motherboard mounted elsewhere in the enclosure. The output connector may be a pin and socket or blade and socket. The output connector may further have blind mating capability. The universal modular power supply carrier may have network interface circuitry within the carrier body or be capable of communication with external network interface circuitry.

In a second aspect of the present invention, an electronic equipment cabinet includes at least one modular unit. At least a portion of the modular unit is capable of housing a universal modular power supply carrier, a connector capable of coupling to the universal modular power supply carrier, and circuitry capable of being powered by the universal modular power supply carrier.

The present invention provides modular design for an electronic system, such as a storage system or computational system, by standardizing a power supply module carrier size, thereby reducing development time and cost. The system cabinet size may also be standardized as a result.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention relates to a universal modular power supply carrier useable in an electronics equipment cabinet, such as an electronic data storage system or computer server. Various sized and/or multiple modular power supplies may be mounted within the carrier body. An electronics equipment cabinet may also be made of a universal size in accordance with the universal modular power supply carrier.

Two power supply system approaches are especially useable with the universal modular power supply carrier of the present invention. The first uses redundant power supplies with outputs such as 3.3, 5, 12, and −12 volts. The second uses two stages in a distributed power system. The first stage includes alternating current (AC) to direct current (DC) power supplies. The second stage includes DC-to-DC power supplies distributed on motherboards and on plug-in cards. Redundant power supplies may be used.

Figure 1:
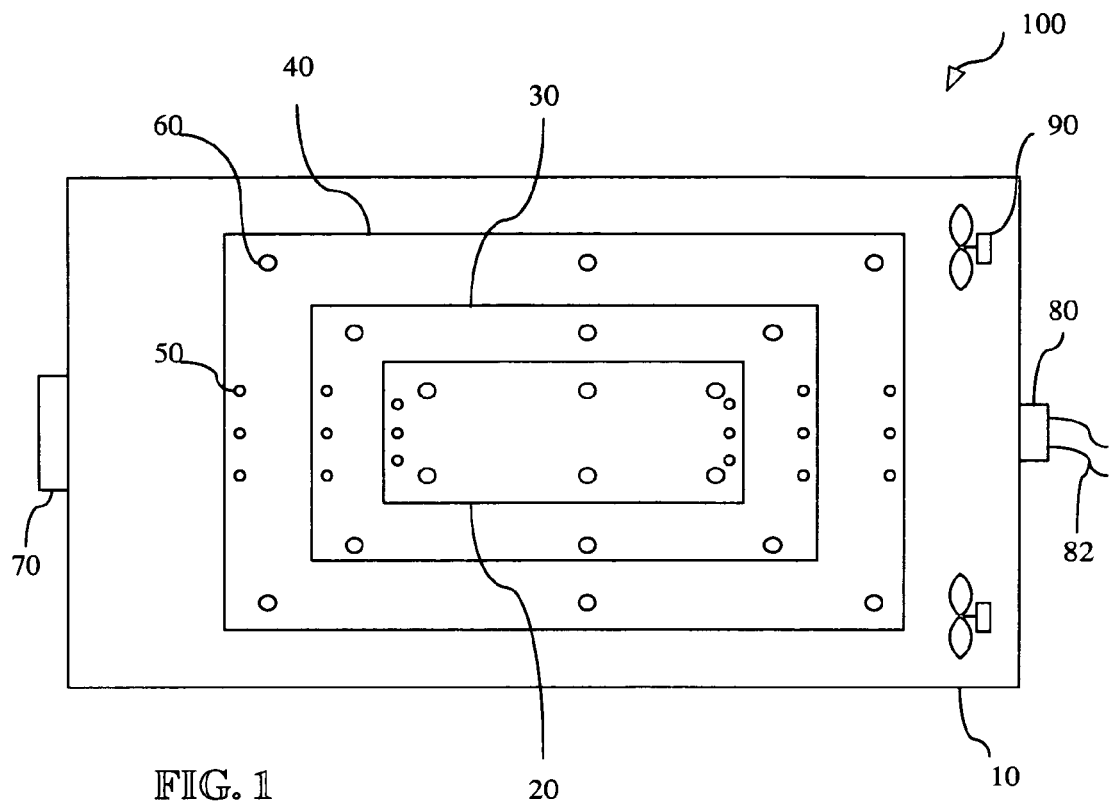
FIG. 1 illustrates a preferred embodiment of the universal modular power supply carrier showing three sizes of power supplies mountable within the carrier.

FIG. 1 illustrates a preferred embodiment 100 of the present invention. The universal modular power supply carrier 10 is a substantially rectangular metal box of a standard size capable of being housed within an equipment chassis, such as for medium to large frame computers and servers. The metal body may be formed of metal sheeting material, such as aluminum, steel, or other suitable metal or alloy, or cast or formed of appropriate material, and may be almost entirely enclosed or may be open on one or more sides. One or more of the sides of the modular power supply carrier may be formed of a metal mesh or hole pattern to provide electromagnetic shielding while providing air flow for effective cooling of the assembly while controlling electromagnetic interference (EMI). Power supplies of various sizes may be mounted within the universal modular power supply carrier 10. For example, a large sized power supply 40, a medium sized power supply 30, or a small sized power supply 20 may be mounted within the universal modular power supply carrier. FIG. 1 shows that a single power supply is mountable within the universal modular power supply carrier; however, two or more power supplies may be mounted in the universal modular power supply carrier, such as in a side-by-side arrangement, in other embodiments. The large sized power supply 40, the medium power supply 30, or the small sized power supply 20 may be held to the universal modular power supply carrier body through attachment points, such as screws, at several locations 60. Within the individual power supplies are input connection points 50 for carrying power or serving as ground and output connection points 50 on the other side of the power supply for supplying power. Cooling may be provided through fans 90 which are conveniently located within the universal modular power supply carrier body. Alternatively, system ventilation may be used for cooling, either with or without fans internal to the metal body, if apertures are appropriately located on the metal body. Wall modifications may be made to enhance air flow and promote more efficient cooling. Ventilation holes may be formed in the universal modular power supply carrier metal body.

Figure 2:
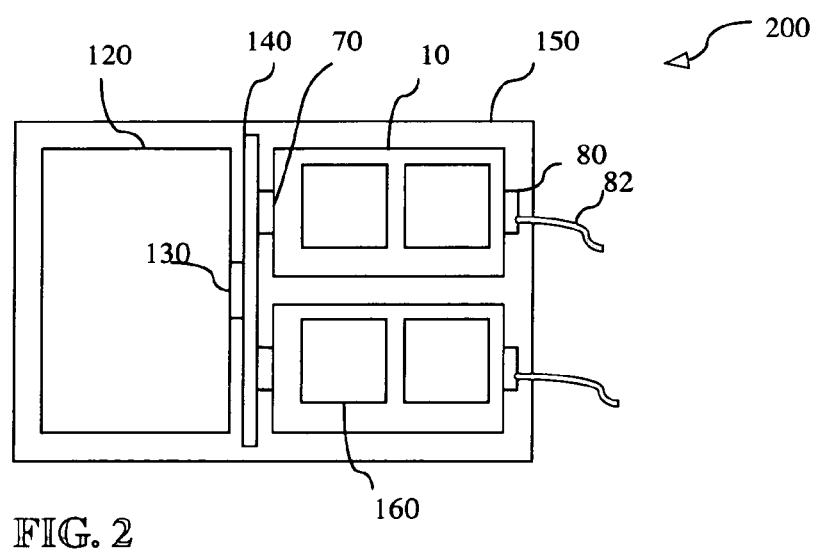
FIG. 2 illustrates an embodiment of an electronic equipment cabinet with two universal modular power supply carriers.

FIG. 2 shows a cabinet 150 using the universal modular power supply carrier 10 of the present invention. In this embodiment 200, two universal modular power supply carriers 10 are shown mounted within a cabinet 150. Each universal modular power supply carrier 10 has two power supplies or power assemblies 160. An alternating current, or direct current, power cord 82 attaches to the universal modular power supply carriers through a receptacle 80. The universal modular power supply carriers attach to connectors 70 on a backplane 140. The motherboard, or electronics module, 120 receives the power and ground voltages through the backplane 140 via connector 130. For example, the two, or more, universal modular power supply carriers (or cradles) may be inserted into the backplane of the file storage system or computational server, in which each cradle contains one or two standard off-the-shelf power supplies.

Figure 3:
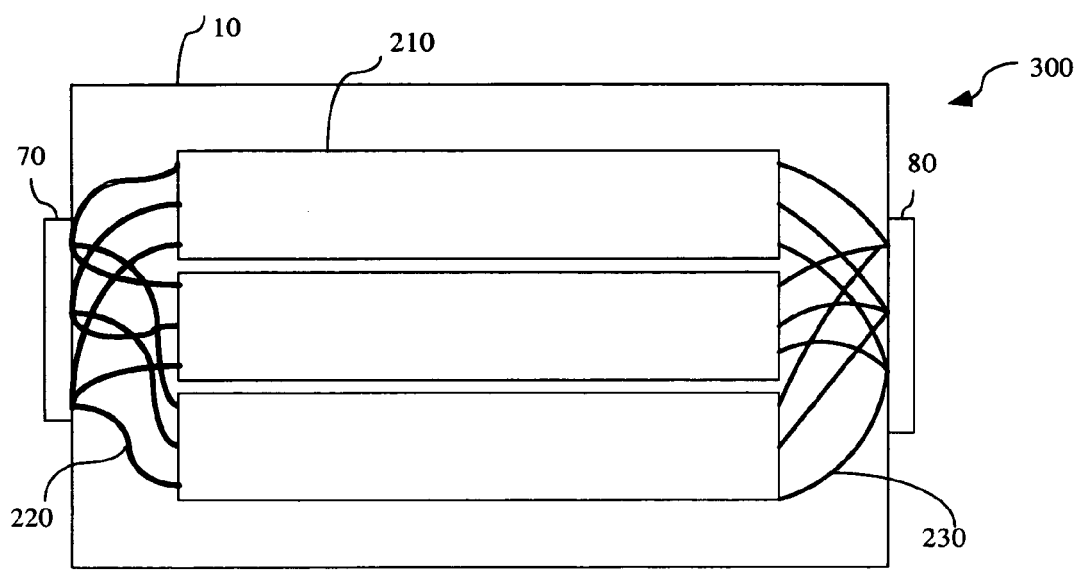
FIG. 3 illustrates an embodiment of the universal modular power supply carrier with three parallel power supplies.

FIG. 3 shows a universal modular power supply carrier 10 with three power supplies 210. Connecting power lines, from the alternating current or direct current receptacle 80, attach to the individual power supplies 210. The output voltages and ground pass from the power supplies 210 to the backplane connector 70 through power lines 220.

Figure 4:
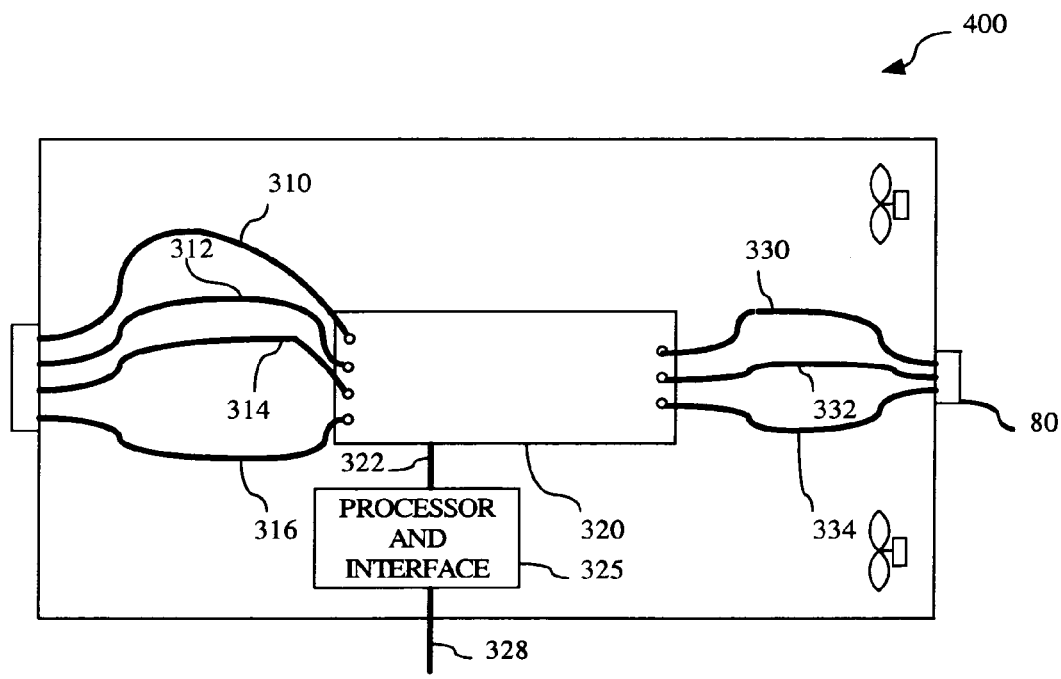
FIG. 4 illustrates an embodiment of the universal modular power supply carrier with a network intelligence card.

FIG. 4 illustrates an embodiment in which a single power supply 320 provides three voltage levels and a ground. For example, power lines 310, 312, and 314 may provide 12 volts, 3.3 volts, and 5 volts, respectively. In this example, line 316 may provide a ground level. The input power, alternating current (AC) or direct current (DC), is provided to the power supply via a line wire 330, a neutral wire 332, and a ground wire 334. In a specific example, a standard 600 W off-the-shelf power supply may be substituted for a custom, existing 300 W Power Supply in the universal modular power supply carrier by wiring the input of the standard power supply to the AC-input connector on the cradle and the outputs of the standard power supply to the output pins of the cradle. Input power may consist of AC input power, a direct current (DC) power source, or a combination thereof, such as from a −48 VDC telecom bus in a telephone center. Alternatively, power supply input may come from a variety of sources, such as nominal 24 VDC, 12 VDC, or aircraft 400 Hz AC.

The universal modular power supply carrier 10 may also include processor and interface circuitry 325 for communications across a bus compliant with a bus standard such as Inter Integrated Circuit (I2C) or Ethernet. Communications may be local area network, wide area network, or web based. The processor and interface circuitry 325 may be built into the universal modular power supply carrier for remote digital control and monitoring, implemented as a network interface card, or externally located. The processor and interface circuitry 325 may monitor internal temperature, currents, voltages, airflow, fan speed, module history, and the like and provide power surge protection. The processor and interface circuitry 325 may also include translation cards mounted within the universal modular power supply carrier 10 or mounted externally on a separate circuit board. The translation card is an add-on card containing line drivers and receivers to transmit address and data signals across the bus. The translation card includes a processor and memory. A lookup table may be accessed as part of the processing. An exemplary use of the translation card is to permit Inter Integrated Circuit (I2C) bus communications with existing power supplies and communications across another bus, such as a Peripheral Component Interconnect (PCI) bus or an Ethernet bus, for providing status, control, and data between the power supply and an operator's station.

Figure 5:
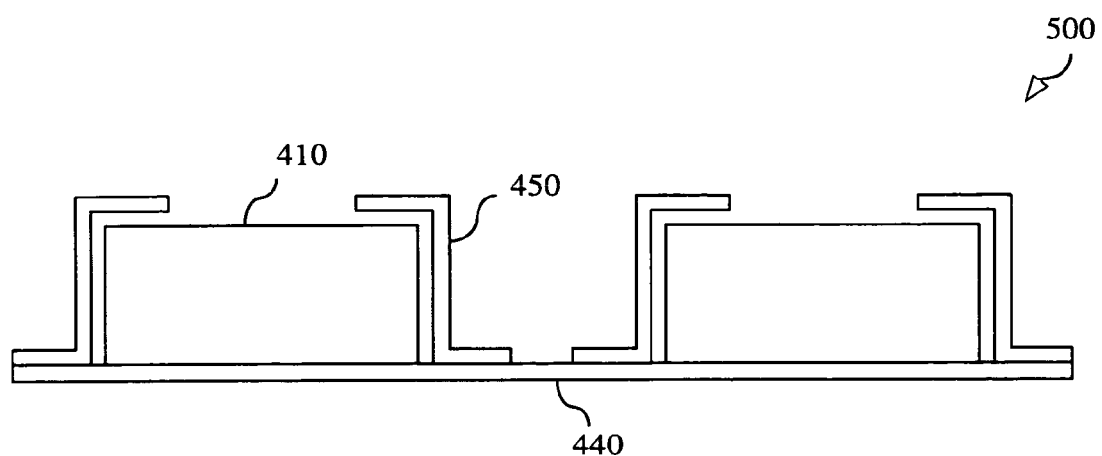
FIG. 5 illustrates a cross sectional view of an embodiment for mounting two power supplies in the universal modular power supply carrier.

FIG. 5 illustrates embodiment 500 of mounts for the power supply 410. In FIG. 5, the retaining mounts 450 are L shaped walls secured to the side of the universal modular power supply carrier. The L shaped walls may actually have a right angled Z shape and may be attached to the bottom side 440 by rivets, screws, weld joints, bolts, projecting bolts, attachment clamps formed from part of bottom side 440, or the like. Other variations, such as clamps, are contemplated by the present invention.

Figure 6:
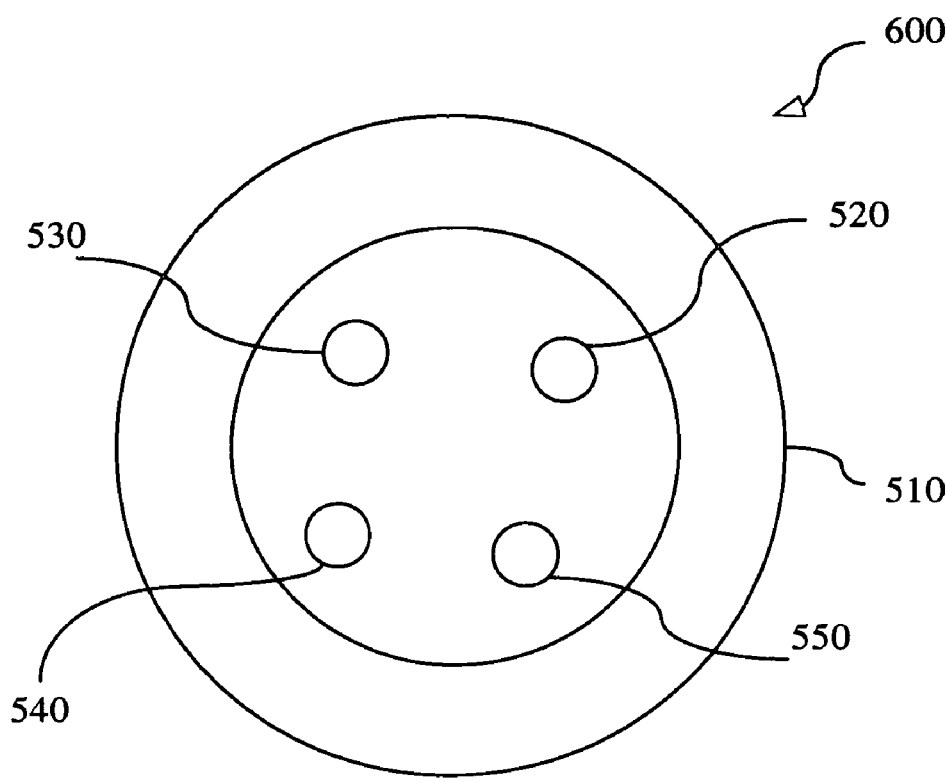
FIG. 6 illustrates an end view of a circular connector useable for supplying voltages and ground from the universal modular power supply carrier.
Figure 7:
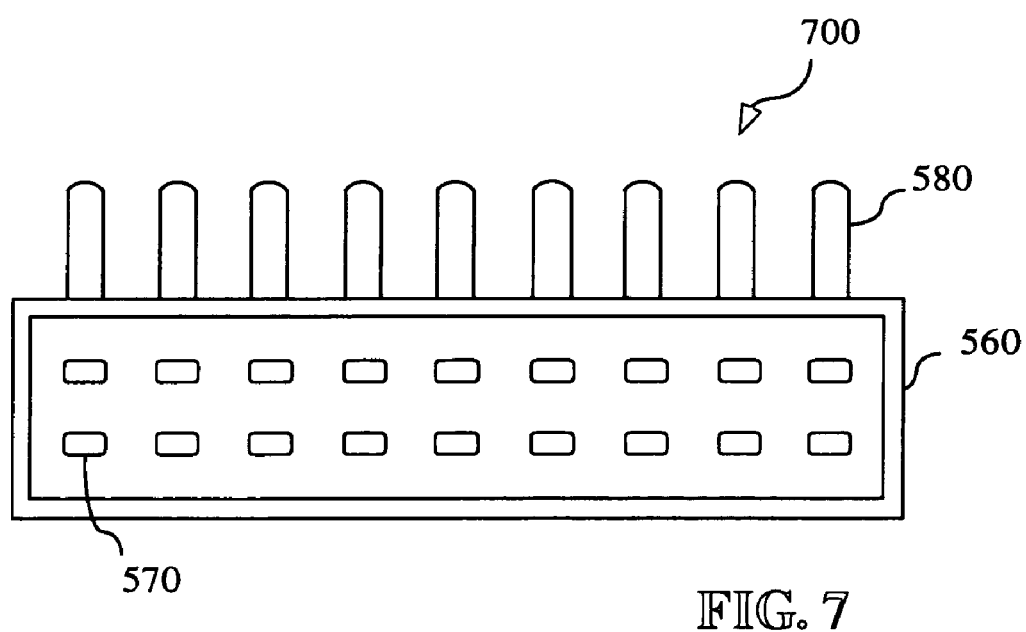
FIG. 7 illustrates an end view of a modular, possibly blind mateable, connector useable for supplying voltages and ground from the universal modular power supply carrier.

FIGS. 6 and 7 illustrate embodiments 600, 700 of connectors useable with the universal modular power supply carrier 10. As shown in FIG. 6, the connector may have a substantially circular cross section. A protective ring shaped body 510 mechanically mates with a receptacle for carrying the input power and ground levels to the universal modular power supply carrier. The receptacle may be located on a backplane within a computer cabinet or like structure. Pins 520, 530, and 540 may be power pins, such as for a 3.3 volt, 5 volt, and 12 volt level and pin 550 may be a ground pin. FIG. 7 shows a pin and socket, possibly with blind-mated capability, connector. Pins 580 extending perpendicularly from the connector body 560 may be single rowed, double rowed, or multiple rowed. Sockets 570 (or pins) may be contained within the end of the connector body 560. Other connector variations are contemplated by the present invention.

Figure 8:
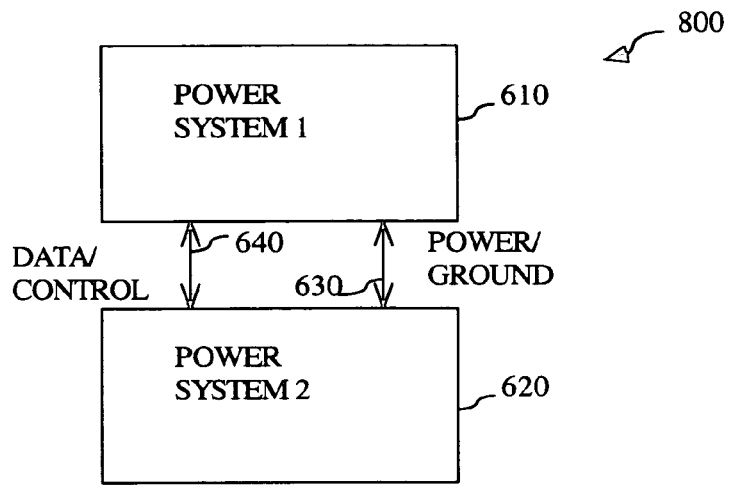
FIG. 8 illustrates an exemplary embodiment of redundant power systems that may use the universal modular power supply carrier.

FIG. 8 shows an exemplary system that may use the universal modular power supply carrier modular power supply of the present invention. Either or both of the power systems 610, 620 may contain one or more universal modular power supply modules. An advantage of the dual power system is to provide redundancy for more reliable operation. The power and ground signals 630 may be shared between the circuitry of the two systems 610, 620. Various control and data signals may be transmitted between the two systems. The power supplies used in the power systems may be switchable power supplies, hot pluggable power supplies, batteries, and the like, in various combinations.

Figure 9:
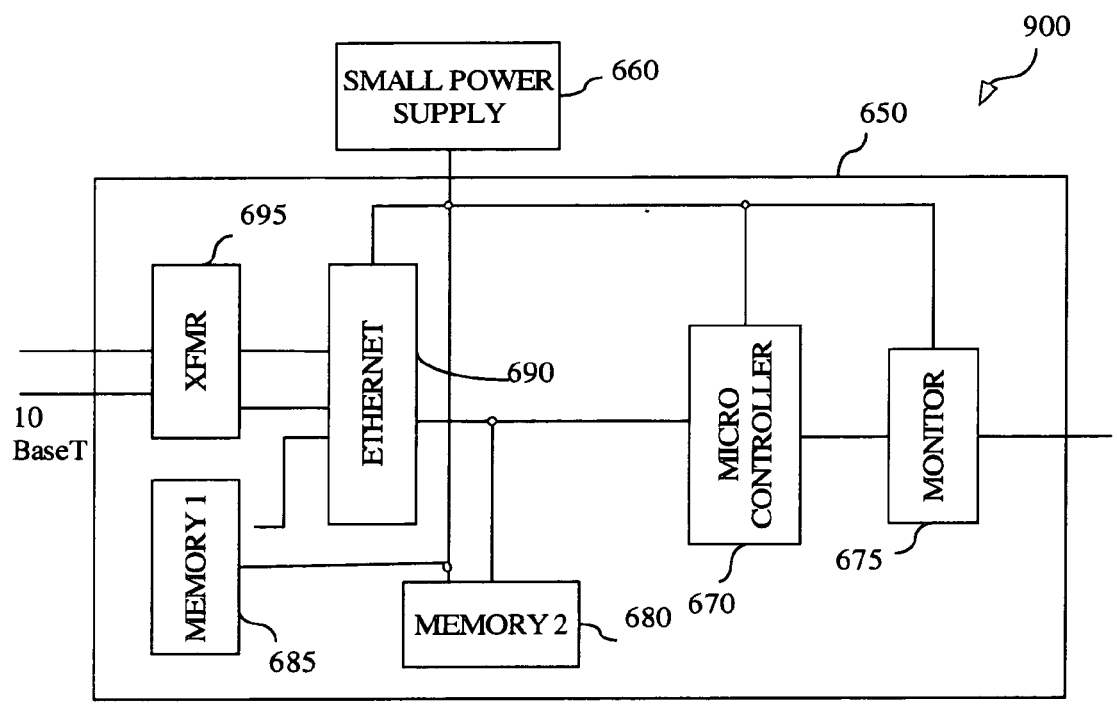
FIG. 9 illustrates an intelligent circuit that may communicate with the universal modular power supply carrier internal circuitry.

A monitoring circuit, such as a maintenance processor, may be separately housed from the universal modular power supply carrier or may be incorporated, in whole or in part, into the universal modular power supply carrier. FIG. 9 shows an embodiment 900 of a maintenance processor 650 useable in a system with the universal modular power supply carrier. This embodiment is especially useful with a two stage distributed power system where the Ethernet Hub blocks communicate with local translation circuits (e.g., Inter Integrated Bus translation circuits) to the input AC-to-48VDC bulk converters or to AC-to-DC multiple output power supplies. A small power supply driven by a common source of power with the universal modular power supply carrier may power the internal circuitry of the device. The maintenance processor 650 may contain an Ethernet card 690 with a memory 685, a microprocessor 670, and a monitor circuit 675 to measure voltage, current, light, heat, and other conditions internal to an electronic equipment. The monitor circuit 675 may be an LM81 or other highly integrated data acquisition system for hardware monitoring of servers or other electronic equipment. The monitor circuit 675 may have an on-chip temperature sensor and may be capable of being programmed to set several fan speeds. Various devices, such as the Ethernet card and the microprocessor 670, may share a second memory 680. The transformer 695 provides DC isolation of the data stream. An exemplary transformer uses 10BaseT, a 10 megabits per second Ethernet standard that uses twisted wire pairs, such as found in Ethernet systems.

Figure 10:
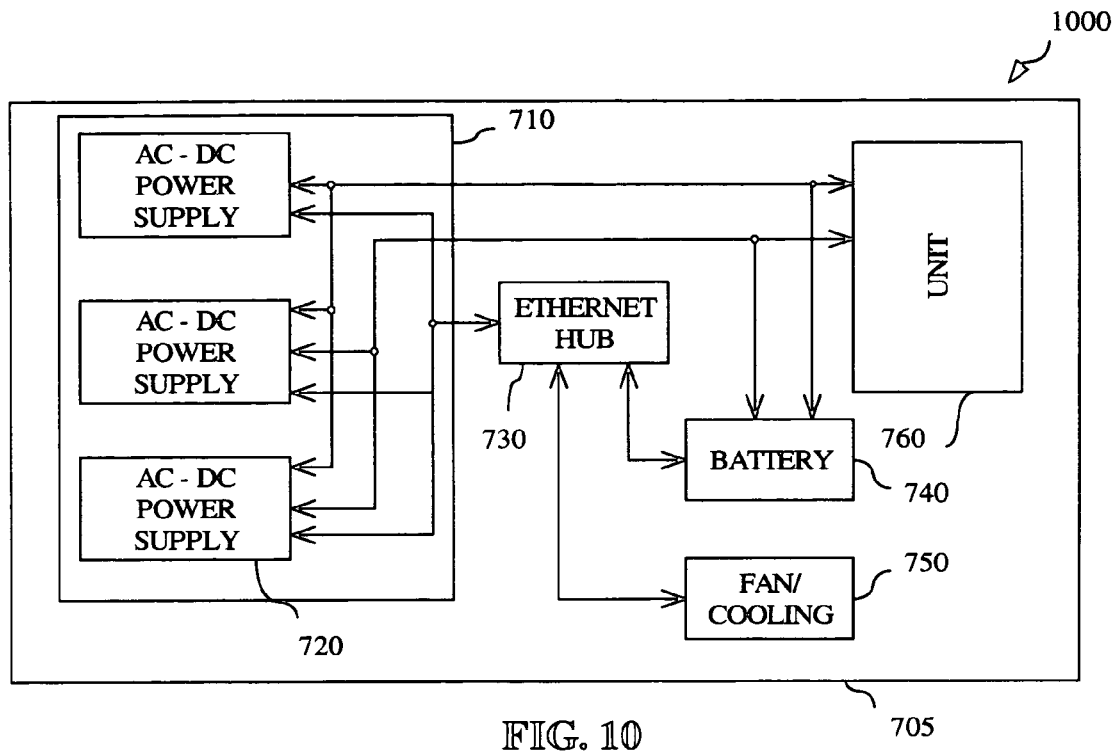
FIG. 10 illustrates a functional block diagram of an embodiment of an electronic equipment cabinet that uses the universal modular power supply carrier with an intelligent control system.
Figure 11:
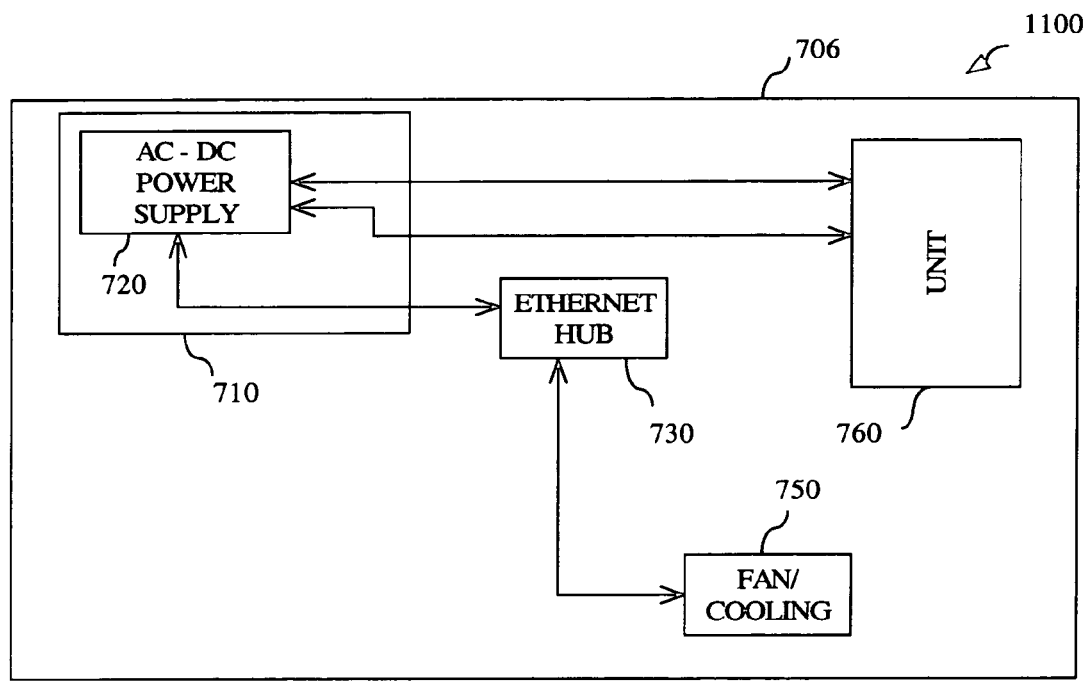
FIG. 11 illustrates a functional block diagram of another embodiment of an electronic equipment cabinet that uses the universal modular power supply carrier with an intelligent control system.
Figure 12:
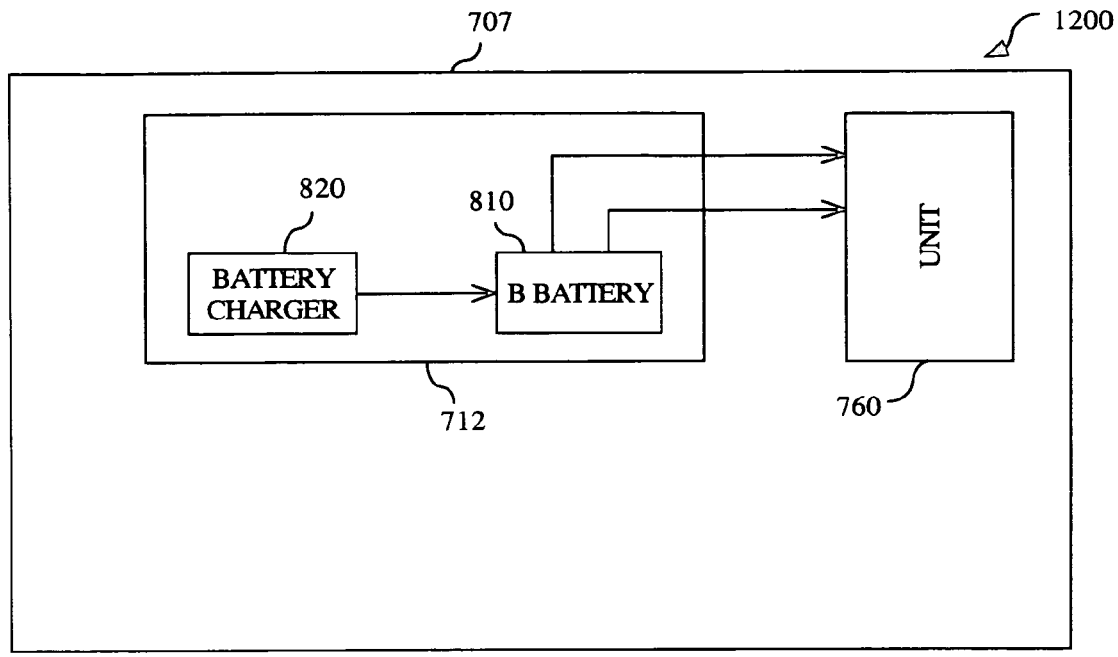
FIG. 12 illustrates a functional block diagram of yet another embodiment of an electronic equipment cabinet which uses the universal modular power supply carrier.
Figure 13:
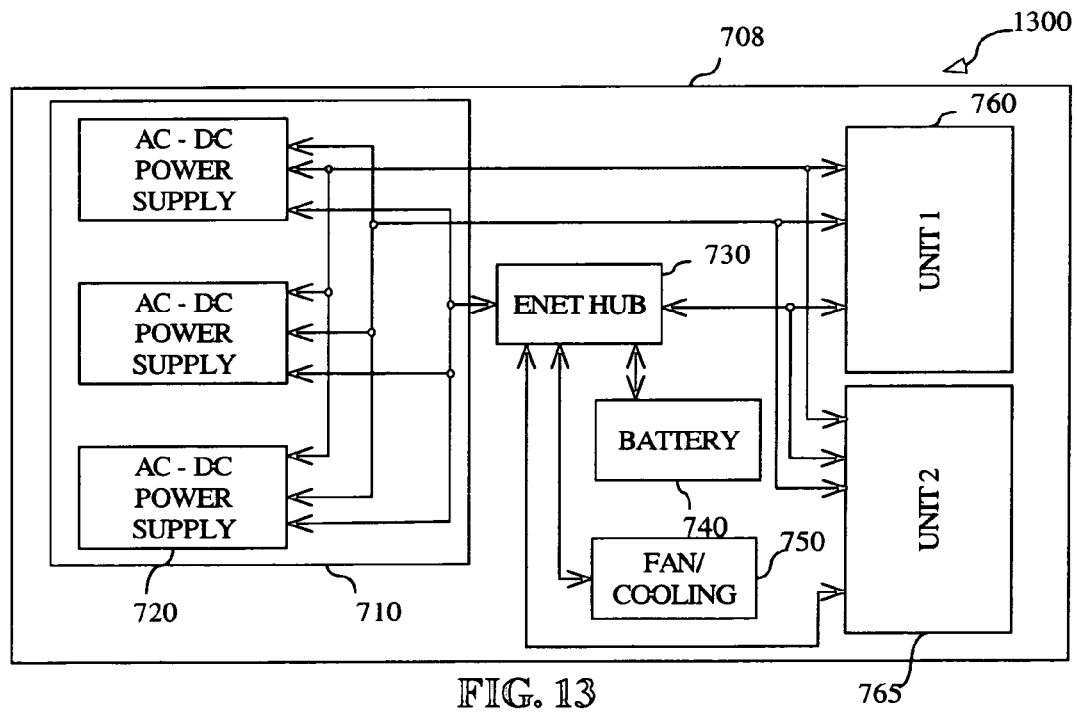
FIG. 13 illustrates a functional block diagram of still yet another embodiment of an electronic equipment cabinet that uses N+1 redundant universal modular power supply carriers with an intelligent control system.

FIGS. 10–13 illustrate various embodiments 1000, 1100, 1200, and 1300 of electronic equipment that uses the universal modular power supply carrier. In FIG. 10, universal modular power supply carrier 710 houses three parallel power supplies 720. A hub 730, such as an Ethernet hub, controls operations, such as switching the cooling system 750 on or off, setting voltages, measuring currents, and providing online diagnostics and configuration. The hub 730 also allows power supply module identification, field upgrades, and security control. The hub 730 may be used for degraded or fail soft operation. If the power supplies go down, a battery backup 740 may be switched on. The unit 760 may contain one or more motherboards, printed circuit boards, and the like. As an example, the unit 760 may be configured with servers, routers, switches, and storage devices. FIG. 11 shows a single power supply 720 in the universal modular power supply carrier 710 and no battery backup. FIG. 12 shows an electronic equipment 707 powered by a battery 810 having a battery charger 820. The battery charger 820 may plug into an alternating current or other outlet. Both the battery charger and the rechargeable battery 810 may be housed in a universal modular power supply carrier 712. The backup battery may be scalable to meet customer needs. FIG. 13 shows a configuration much like the configuration of FIG. 10 except that two units 760, 765 are supplied power by the universal modular power supply carrier modular power supply 710.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages, the form hereinbefore described being merely an explanatory embodiment thereof. It is the intention of the following claims to encompass and include such changes.

What is claimed is:

1. An electronic equipment cabinet, comprising:
   a shelf;
   a universal modular power supply carrier that is configured for housing different physical sizes of a modular power supply, the universal modular power supply carrier being supported by at least a portion of the shelf;
   a connector mounted within the shelf configured for coupling to the universal modular power supply carrier; and
   circuitry configured for being powered by the universal modular power supply carrier through the connector,
   wherein the universal modular supply carrier comprises:
   a substantially rectangular body formed of a rigid material; and
   a network interface circuitry mounted within the rectangular body;
   wherein the network interface circuitry contains a processor circuitry and an interface circuitry for translating integrated circuit bus signals to network interface circuitry bus signals, and
   wherein the network interface circuitry contains a processor circuitry and an interface circuitry for translating network interface circuitry bus signals to integrated circuit bus signals.

2. The electronic equipment cabinet of claim 1, wherein the circuitry includes a motherboard or an electronics module.

3. The electronic equipment cabinet of claim 2, wherein the circuitry further includes at least one printed circuit board.

4. The electronic equipment cabinet of claim 3, wherein the universal modular power supply carrier is electromagnetic interference shielded.

5. The electronic equipment cabinet of claim 2, wherein the universal modular power supply carrier is electrically connected to the motherboard or the other electronics module through a backplane.

6. The electronic equipment cabinet of claim 2, further comprising a maintenance processor that monitors a power supply contained within the universal modular power supply carrier.

7. The electronic equipment cabinet of claim 6, wherein the maintenance processor interfaces with a networking Ethernet hub, switch or router.

8. The electronic equipment cabinet of claim 2, further comprising a networking Ethernet hub, switch or router communicatively coupled to the motherboard or the electronics module.

9. The electronic equipment cabinet of claim 1, further comprising a networking Ethernet hub, switch or router, communicatively coupled to the universal modular power supply carrier.

10. The electronic equipment cabinet of claim 9, wherein the networking Ethernet hub, switch or router controls a cooling system of the electronic equipment cabinet.

11. The electronic equipment cabinet of claim 9, wherein the networking Ethernet hub, switch or router is electrically connected to a battery backup.

12. An electronic equipment cabinet, comprising:
   an enclosure constructed to contain electronic components, the enclosure including at least one shelf for supporting a received component;
   a connector mounted to the shelf, the connector being arranged to electrically connect with a received component;
   a universal power supply carrier; and
   an interface circuitry constructed to permit at least one of remote control or monitoring the power supply included in the universal power supply carrier,
wherein the carrier is configured to accept a power supply conforming to at least one of a first configuration of a first size, or a second configuration of a second size which is of a smaller size than the first size,
wherein the carrier is constructed to be supported by at least a portion shelf, in order to electrically couple the power supply included in the universal power supply carrier with the connector
wherein the universal modular supply carrier comprises:
   a substantially rectangular body formed of a rigid material:
   a network interface circuitry mounted within the rectangular body:
wherein the network interface circuitry contains a processor circuitry and an interface circuitry for translating integrated circuit bus signals to network interface circuitry bus signals, and
wherein the network interface circuitry contains a processor circuitry and an interface circuitry for translating network interface circuitry bus signals to integrated circuit bus signals.

13. The electronic equipment cabinet of claim 12, wherein the universal carrier includes attachment points for securing the first power supply and the second power supply.

14. The electronic equipment cabinet of claim 12, wherein the interface circuitry monitors at least one of internal temperature, currents, voltages, airflow, fan speed, or module history.

15. The electronic equipment cabinet of claim 12, wherein the universal power supply carrier is formed of electromagnetic shielding material.

* * * * *